United States Patent [19]

Draper et al.

[11] 4,263,637
[45] Apr. 21, 1981

[54] GROUND FAULT RECEPTACLE

[75] Inventors: Charles W. Draper, Clearwater; Raymond H. Legatti, Belleair, both of Fla.

[73] Assignee: Square D Company, Palatine, Ill.

[21] Appl. No.: 806,564

[22] Filed: Jun. 14, 1977

Related U.S. Application Data

[63] Continuation of Ser. No. 674,714, Apr. 8, 1976, abandoned.

[51] Int. Cl.³ .............................................. H02H 3/28
[52] U.S. Cl. ......................................... 361/45; 361/56
[58] Field of Search .................................. 361/42–50, 361/56

[56] References Cited

U.S. PATENT DOCUMENTS

| | | | |
|---|---|---|---|
| 3,836,821 | 9/1974 | Wahlgren et al. | 361/45 |
| 3,936,699 | 2/1976 | Adams | 361/45 |

FOREIGN PATENT DOCUMENTS 203304  2/1971  Fed. Rep. of Germany ...... 323/227 X Primary Examiner—Harry E. Moose, Jr.
Attorney, Agent, or Firm—H. J. Rathbun; E. S. Kettelson; R. T. Guttman

[57] ABSTRACT

An electric receptacle for trade size outlet boxes having a ground fault circuit interrupting mechanism incorporated therein. A receptacle housing includes contact jaws seated therein to receive the plug of a conductor leading to a load, electronic components to detect a ground fault and grounded neutral condition on the load side of the receptacle, plus a coil and trip mechanism to open the receptacle circuit on occurrence of a ground fault or grounded neutral condition. The complete receptacle assembly is approximately the same depth as conventional household receptacles which do not have ground fault circuit interrupting means included therein. Means to periodically test the ground fault interrupting mechanism is also included in the receptacle assembly, as well as means to indicate the circuit has been interrupted and means to reset.

1 Claim, 12 Drawing Figures

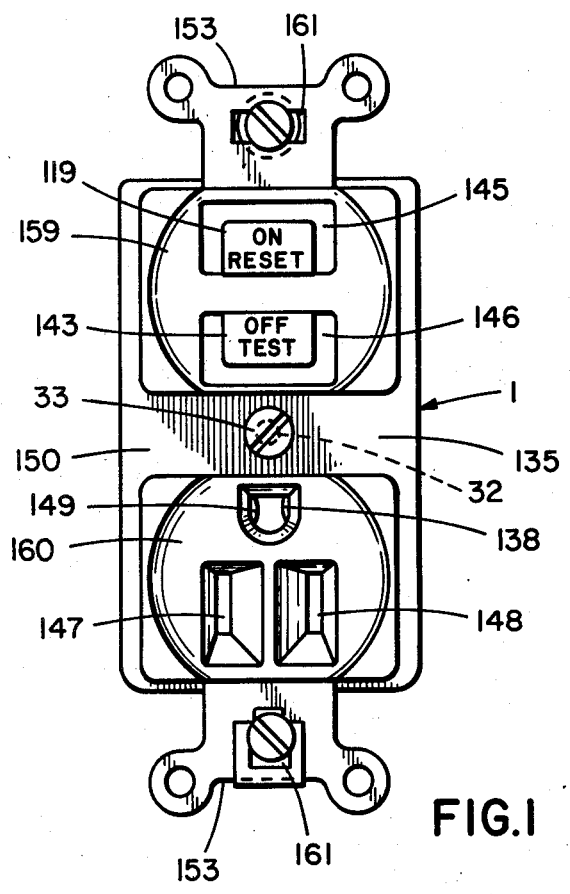

GROUND FAULT RECEPTACLE

This is a continuation of application Ser. No. 674,714, filed Apr. 8, 1976 now abandoned.

BACKGROUND OF THE INVENTION

This invention relates to the field of ground fault protective devices sensitive enough to protect humans from the hazards of electric shock resulting from ground fault currents. In the typical alternating current installation, the neutral conductor is grounded at its source. If electrical contact is made with the electrified or "hot" conductor by a person standing on the ground, part of the current is diverted from its normal circuit through the electrified and neutral conductor and follows a ground path circuit through the person back to the neutral grounded at the source. To protect against such hazard, ground fault interrupting devices have been provided for installation in circuit breakers of branch circuits, and in portable units for temporary field use on construction sites. Attempts have also been made to mount such devices in receptacles for installing in ordinary household outlet boxes where ground fault protection is most needed, such as bathrooms, kitchens and garages. By having the entire ground fault sensing and interrupting mechanism in the receptacles where most needed, the entire branch circuit is not interrupted every time the ground fault mechanism interrupts the receptacle circuit.

A disadvantage of the receptacle mounted ground fault interrupting devices hitherto known is their size, usually requiring oversize outlet boxes. The ground fault receptacle in accordance with this invention is compact enough to be installed in the same outlet boxes as conventional receptacles without ground fault protection which the receptacles in accordance with this invention replace. It is not necessary to remove the original outlet boxes and install new ones of larger volume in bathrooms, kitchens and garages in order to obtain ground fault protection wherever desired by using the new receptacles disclosed and described herein.

SUMMARY OF THE INVENTION

It is an object of the invention to provide a compact receptacle having complete ground fault interrupting means which may be installed as a replacement for conventional receptacles in their original outlet boxes.

It is an object of the invention to provide a compact ground fault receptacle having improved miniaturized components and circuits to make a more compact ground fault receptacle possible.

It is an object of the invention to provide a compact ground fault receptacle having direct connection terminal means and being sufficiently compact to permit direct connection of line-side and load-side conductors to said receptacle, eliminating the need for external pig tails for connection of said conductors to said receptacle.

It is an object of the invention to provide a ground fault receptacle having miniaturized components and circuitry, in which a rectification bridge is provided having avalanche diodes with a reverse voltage breakdown characteristic selected to prevent the D.C. voltage appearing across said bridge from exceeding such pre-selected value, thus eliminating the need for a separate component to protect from nuisance tripping and damage due to high voltage conditions.

It is an object of the invention to provide a ground fault receptacle having miniaturized components and circuitry in which a ground fault sensing and interrupting circuit is powered on the line-side of the circuit interrupting contacts, and in which electronic switch means for energizing a trip coil to open said interrupting contacts is connected to commutate off automatically after the ground fault has been cleared, thereby eliminating the need for a separate switch to open the line-side connected coil circuit.

BRIEF DESCRIPTION OF THE DRAWING

FIG. 1 is a top plan view of a ground fault receptacle in accordance with this invention.

FIG. 2 is a side elevation of the receptacle in FIG. 1.

FIG. 3 is a bottom plan view of the receptacle in FIG. 1.

FIG. 7 is a section taken on line 7—7 of FIG. 4.

DESCRIPTION OF PREFERRED EMBODIMENT

Figure 4:
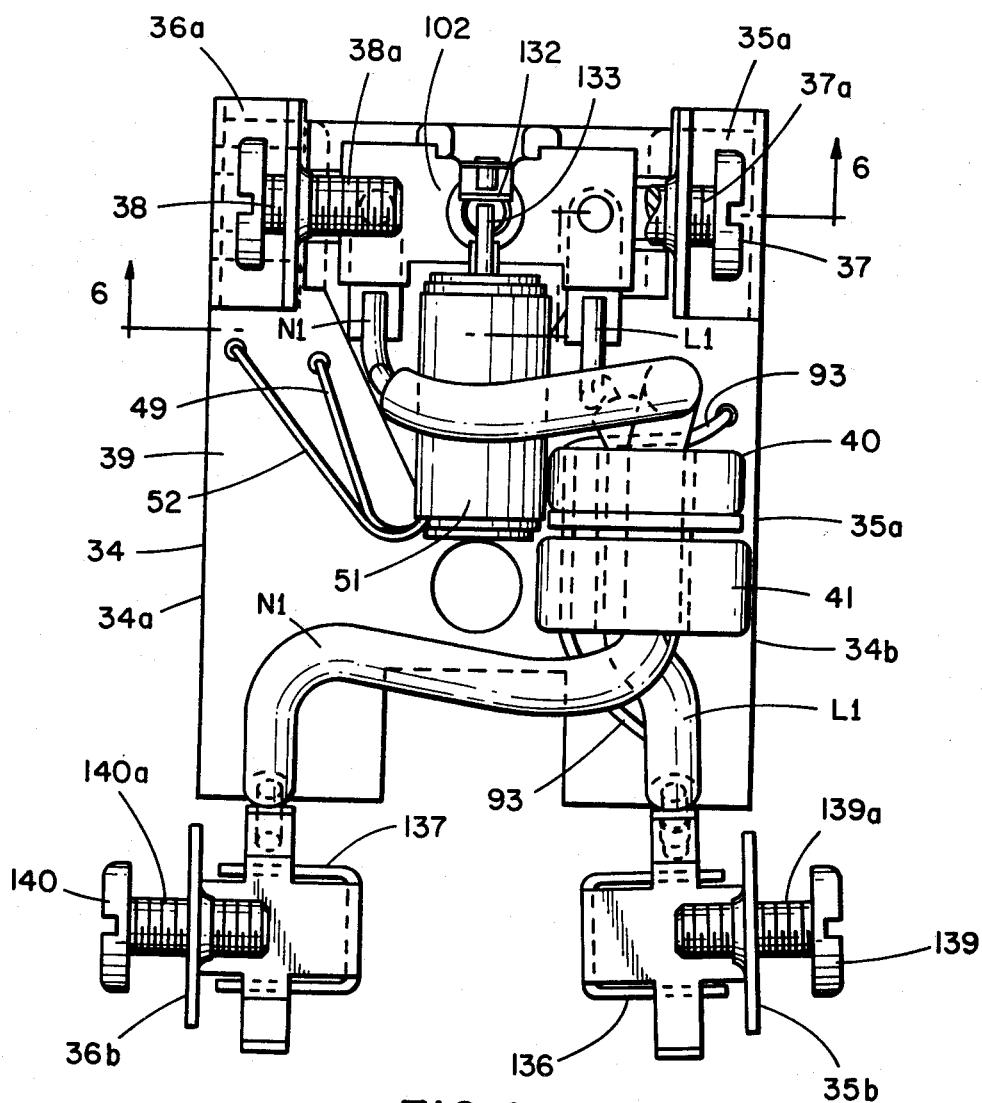
FIG. 4 is a bottom plan view of a circuit board with electronic components mounted thereon and terminals connected thereto.
Figure 6:
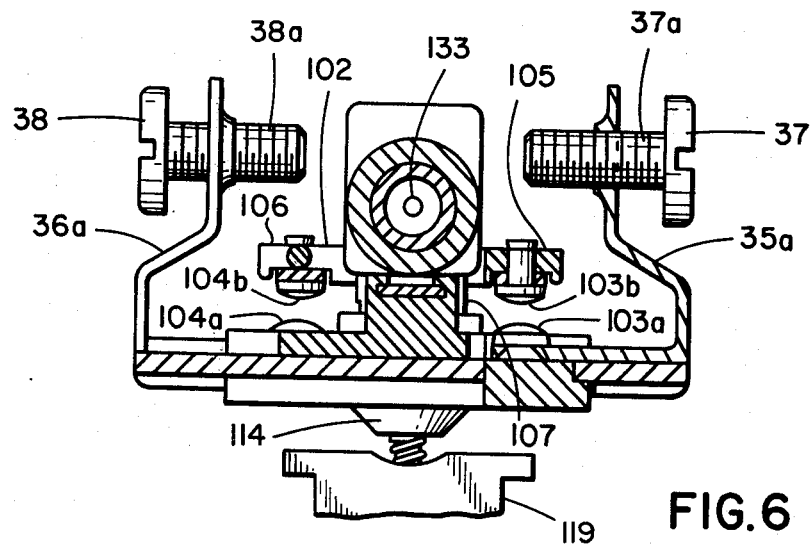
FIG. 6 is a section taken on line 6—6 of FIG. 4.
Figure 8:
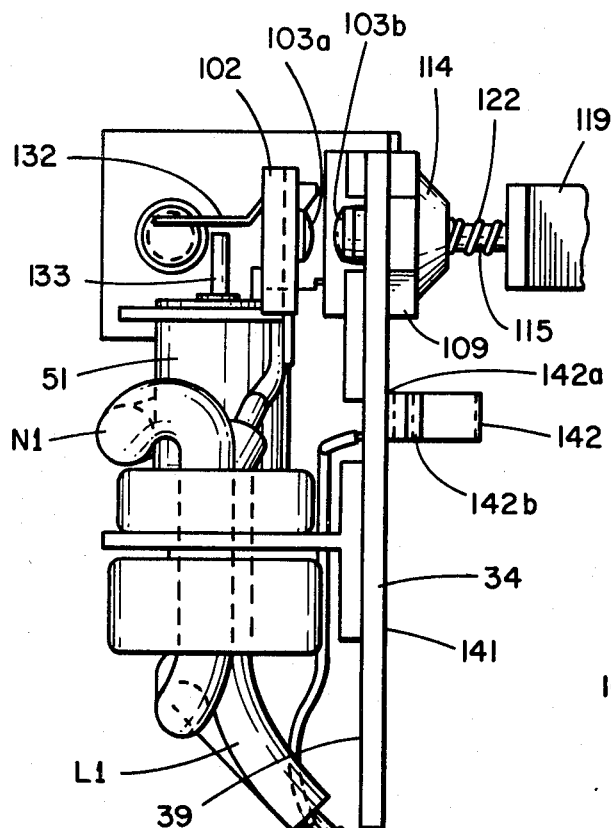
FIG. 8 is a bottom plan view of the movable contact carrier, reset and trip assembly.
Figure 5:
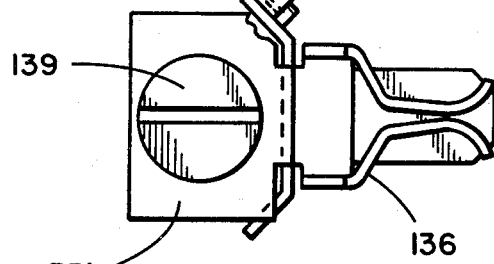
FIG. 5 is a side elevation of FIG. 4 having a side terminal removed.
Figure 9:
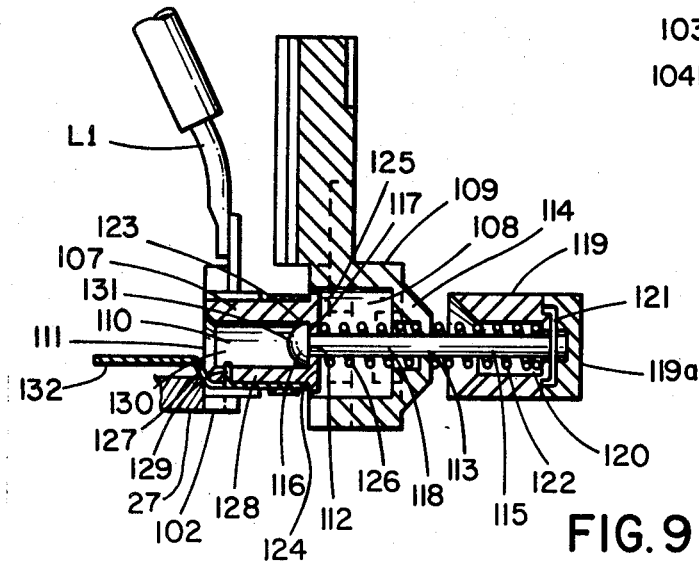
FIG. 9 is a section taken on line 9—9 of FIG. 8.
Figure 10:
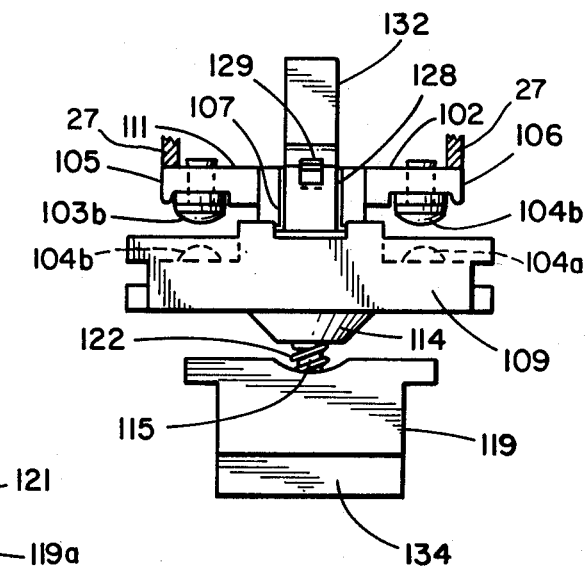
FIG. 10 is an end view of the contact carrier, reset and trip assembly.
Figure 11:
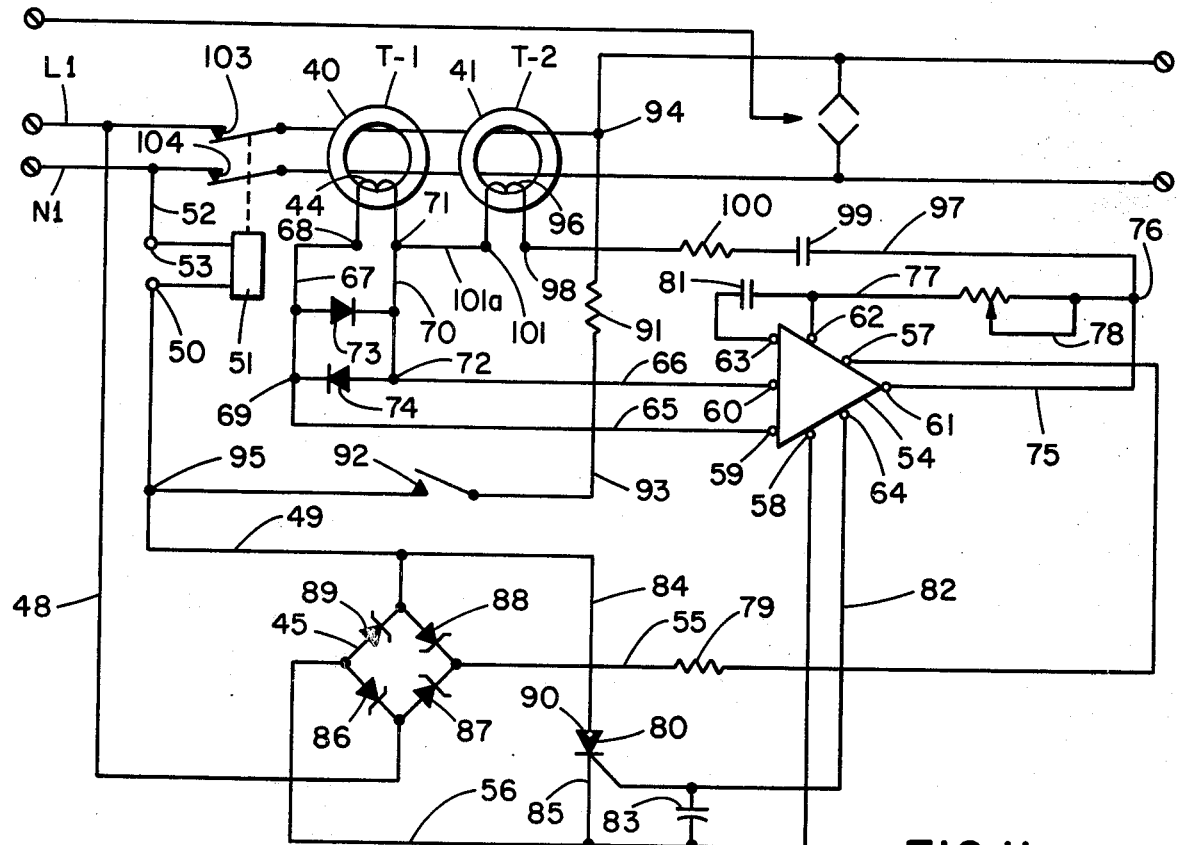
FIG. 11 is a schematic drawing of the ground fault detection, grounded neutral detection and interrupting circuit in accordance with this invention.
Figure 12:
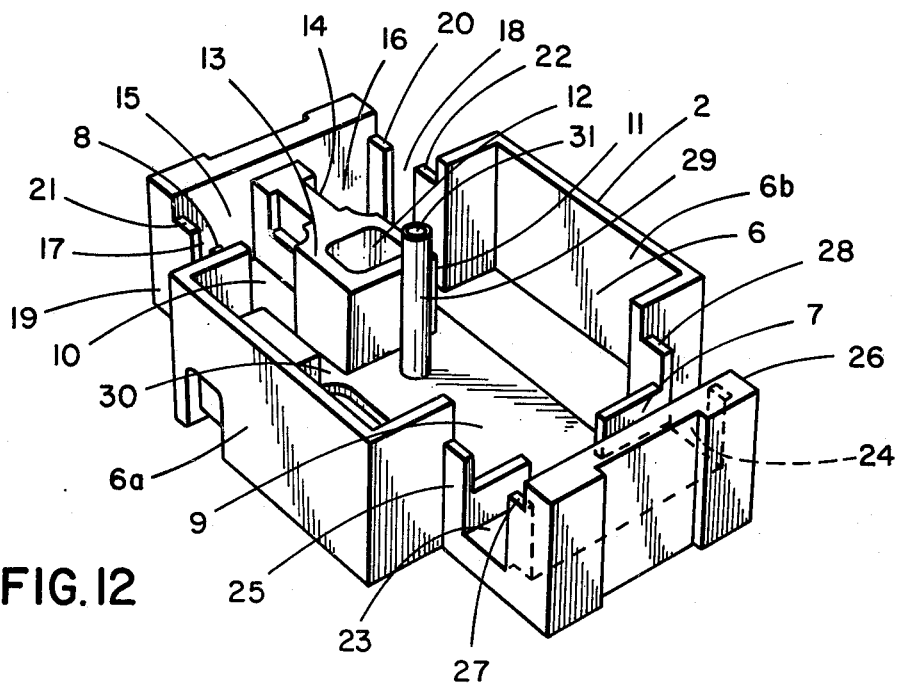
FIG. 12 is a plan view of the receptacle case.

A compact ground fault receptacle 1 in accordance with this invention includes an insulated receptacle case 2 and a receptacle cover 3. A metal mounting strap or yoke 4 is secured to the case 2, and includes grounding terminal 5 formed as an extension thereof.

The receptacle case 2 includes an intermediate compartment 6, a line-side terminal compartment 7 at one end of the intermediate compartment 6 and a load-size terminal compartment 8 at the opposite end of intermediate compartment 6.

An open entrance-way 9 leads from intermediate compartment 6 to line-side terminal compartment 7. An open entrance-way 10 leads from intermediate compartment 6 to load-side terminal compartment 8. A mounting pedestal 11 having a deep recess 12 therein opening to the top 13 thereof is positioned at entrance-way 10 centrally thereof and inwardly of intermediate compartment 6. An insulating dividing wall 14 extends from pedestal 11, at the midpoint thereof, into load-side terminal compartment 8 to divide it into two compartment cells 15 and 16. Vertical slots 17 and 18 are formed in exterior side walls 19 and 20, opening to the upper edges 21 and 22 thereof. The dividing wall 14 provides an insulating barrier to electrically insulate compartment cells 15 and 16 from each other.

In line-side terminal compartment 7, vertical slots 23 and 24 are formed in exterior side walls 25 and 26 opening to top side edges 27 and 28.

A post 29 extends upwardly from the bottom 30 of intermediate compartment 6 at the central region thereof for attaching communication with receptacle cover 3. Post 29 includes a central bore 31 opening to the top, the bore 31 being internally threaded. When receptacle cover 3 is in place over receptacle case 2, aperture 32 in cover 3 is in registration with bore 31 of post 29. Anchor screw 33 is placed through aperture 32 and rotated in base 31 for threaded engagement with post 29.

A printed circuit board 34 is dimensioned to overlay intermediate compartment 6 and line-side terminal compartment 7, with the side edges 34a and 34b of printed circuit board 34 extending flush with side walls 6a and 6b of intermediate compartment 6 and resting on top thereof. The forward ends of side edges 34a and 34b overhang the respective side walls 25 and 26 of line-side terminal compartment 7.

Line side terminals 35a and 36a are affixed to the forward end of circuit board 34, one on each side thereof, to depend downward in straddling relationship with the side walls 25 and 26 of line-side terminal compartment 7. Terminal screws 37 and 38 are threadedly mounted through corresponding threaded apertures in the depending side walls of terminals 35a and 36a respectively. The shanks 37a and 38a of said terminal screws project inwardly from their respective terminal side walls with the respective inner ends of said terminal screws in opposed facing relationship. When the printed circuit board 34 with terminals 35a and 36a depending from the side edges at the forward end thereof is placed over the top of intermediate compartment 6 and line-side terminal compartment 7 for installing therein, the shanks 37a and 38a are received respectively in slots and in side walls 25 and 26 of the line-side terminal compartment 7.

The ground fault sensing and grounded neutral detecting components and the tripping mechanism are mounted on the inward facing side 39 of printed circuit board 34. These include two differential transformers T-1 and T-2 comprising a ground fault sensing toroid 40 and a coupling toroid 41 respectively, through which a "hot" or electrified conductor L1 and a neutral conductor N1 extend to constitute the primary windings thereof. The electrified conductor L1 is connected to line-side terminal 35a on one side of toroids 40 and 41, and after passing through said toroids, it is connected to load side terminal 35b. The neutral conductor N1 is connected to line-side terminal 36a on one side of toroids 40 and 41, and after passing through said toroids, it is connected to a load side terminal 36b.

The differential transformer T-1 which includes toroid 40 functions as a so-called zero sequence transformer to sense the occurrence of a ground fault on the load side of the electrified conductor L1. When no ground fault is present, the magnetic fields resulting from current flow in electrified conductor L1 in one direction and in neutral conductor N1 in the opposite direction are of opposite polarity and equal. The magnetic fields thus cancel out. However, when a ground fault occurs in the electrified conductor L1 on the load side of toroid 40, a portion of the current returns to source through a ground path rather than through neutral conductor N1. Thus, the respective magnetic fields of electrified conductor L1 and neutral conductor N1 are unbalanced as they pass through toroid 40 where they constitute the primary winding of this differential transformer. Accordingly the magnetic fields do not cancel out, and a net amount of magnetic flux is available to be picked up in secondary winding 44 on toroid 40 and thus induce a voltage signal therein.

The detection and interruption circuit is powered as follows. A full wave bridge 45 having avalanche characteristics is connected across line conductor L1 and neutral conductor N1 on the line or source side of interrupting contacts 103 and 104, by means of conductor 48 connected to one side of the bridge and conductor 49 connected to the other side and extending to terminal 50 of trip coil 51. Conductor 52 extends from trip coil terminal 53 to neutral conductor N1. Bridge 45 provides a rectified power supply to an integrated circuit component 54 through conductors 55 and 56 connected to pins 57 and 58 respectively of I.C. component 54.

The I.C. component 54 includes therein an operational amplifier, voltage regulator and level detector. The pins designated 57 and 58 represent the voltage regulator portion, pins designated 59, 60, 61, 62 and 63 represent the operational amplifier portion, and pin 64 represents the level detector portion.

As stated above, a rectified power supply is fed from bridge 45 to I.C. 54 and connected to pins 57 and 58 which represent the voltage regulator portion of the I.C. chip 54 and which sets the appropriate voltage level for the operational amplifier portion of the chip.

When a ground fault occurs in line conductor L1, on the load side of the toroid 40, part of the current returns to source through a ground path rather than through the neutral conductor N1, creating an imbalance in the respective magnetic fields of L1 and N1 where they pass through toroid 40. As described above, a net amount of magnetic flux is thus available to induce a voltage signal in secondary winding 44. This voltage signal is transmitted to the operational amplifier stage of I.C. 54 by way of an input circuit comprising conductor 65 leading to pin 59 (an inverting input terminal of the operational amplifier stage), and conductor 66 leading to pin 60 (a non-inverting input terminal of the operational amplifier stage). Conductor 67 leads from terminal 68 of secondary winding 44 to the junction 69 with conductor 65. Conductor 70 leads from the other terminal 71 of secondary 44 to the junction 72 with conductor 66.

Diodes 73 and 74 are connected in parallel with secondary winding 44 to prevent saturation of the transformer toroid core 40 during very high values of ground fault current.

When the induced voltage signal transmitted from secondary winding 44 is received on pins 59 and 60 of the op amp stage of I.C. 54, it is transmitted to the output pin 61, from which it flows through a negative feed back path, comprising conductor 75 to junction 76 and then to an inverting input 62 through conductor 77 and a one megohm potentiometer 78. This negative feedback path controls the gain of the amplifier stage, and the potentiometer may be adjusted to control the ground fault trip current. For example, it may be adjusted so when there is 5 milliamps difference between the currents in line conductor L1 and neutral conductor N1, the amplifier output peak voltage exceeds the reference voltage of the level detector stage, supplied by the voltage regulator stage which in turn receives a DC voltage supply on pins 57 and 58 from bridge 45 through a voltage dropping resistor 79. When the output peak voltage of the amplifier stage exceeds the reference voltage, a D.C. voltage is produced at pin 64 of the level detector stage which triggers silicon controlled rectifier (SCR) 80 into conduction.

Capacitor 81 is connected across input terminals 62 and 63 of the op amp stage of I.C. 54 to provide a low pass filter for additional immunity to spurious noise signals.

The D.C. voltage from pin 64 of I.C. 54 is fed to the gate of SCR80 through conductor 82. Capacitor 83 is connected across the cathode-gate circuit of SCR80 to prevent it from triggering and tripping the circuit due to noise on the circuit which could be amplified by I.C. 54. A high enough noise level will trip the SCR80 and is preferred to as a first predtermined noise level.

When SCR80 is triggered into conduction line voltage is applied to trip coil 51 causing it to trip thus opening contacts 46 and 47 to interrupt the power line circuit. When SCR80 conducts, a circuit is completed from N1 through conductor 52, terminals 50 and 53 of trip coil 51, conductors 49 and 84 to SCR80, conductors 85 and 56, zener diode 86 and conductor 48 to L1.

The full wave rectifier bridge 45 includes zener diodes 86, 87, 88 and 89. The diodes are selected to avalanche with a reverse voltage between 200 and 300 volts peak. If a voltage transient, a predetermined second level of noise voltage in excess of 300 volts peak occurs between conductors L1 and N1 of the power circuit, the avalanche or zener diodes 86–89 will avalanche and clip the voltage at a safe amplitude to protect SCR80 and I.C. 54 from damage. The impedance of trip coil 51 acts as a choke to limit current sufficiently on occurrence of such high transients to protect the diodes 86–89 from being damaged. By using a rectification bridge of this type with avalanche or zener diodes, an additional component such as a metal oxide varistor (MOV) used in other ground fault protector circuits is not needed for impulse protection. The avalanche rectification bridge in accordance with this invention performs the dual functions of rectification and protection from high voltage transients.

In accordance with this invention, the ground fault protection circuit is powered from the line side of the interrupting contacts 46 and 47. In this way, the ground fault protection circuit remains powered even after the power circuit has been interrupted by opening of contacts 46 and 47. In other devices of this type which power the ground fault protective circuit from the line side, a separate switch is used to deenergize the trip coil after tripping for a ground fault. In the present invention, a separate switch is not needed for this purpose. The problem of de-energizing the trip coil after tripping for a ground fault is solved by connecting the anode end 90 of SCR80 to the A.C. side of bridge 45 rather than to the D.C. side as is customary in prior art devices. The anode end 90 is connected to the A.C. power line circuit through conductors 84, 49, coil 51 and conductor 52 to the neutral conductor N1. This means that the SCR80 operates in the half wave mode and commutates off once every cycle. Therefore, when the fault is removed by opening of the contacts as the next line voltage excursion through zero, the SCR80 turns off.

A test circuit is provided which includes a 15 kilohm resistor 91 in series with test switch 92 in conductor 93 extending from junction 94 with line conductor L1 on the load side of the differential transformer toroid 40 to junction 95 with conductor 49 leading to neutral conductor N1 on the line side of toroid 40. Thus, when test switch 92 is closed, current imbalance occurs at toroid 40 as a result of current bypassing the neutral conductor at that point returning to neutral from junction 94 through the test circuit. If the ground fault protection circuit is working properly, such current imbalance will induce a pick-up signal which will be amplified and trip the circuit in the manner described.

The ground fault protection circuit also includes protection against a ground on the neutral conductor which if not detected and cleared would adversely affect the sensitivity of the circuit. Protection against a grounded neutral is provided as follows.

A coupling transformer T-2 including toroid 41 having a winding 96 is connected to the output 61 of the operational amplifier stage of I.C. 54, by means of a feedback circuit. Conductor 97 extends from terminal 98 of the winding 96 to junction 76 to receive an output from terminal 61 of the op amp. A capacitor 99 and resistor 100 are connected in series in conductor 97 to complete a regenerative feedback path from the output stage of the op amp to the transformer winding 96 on toroid 41 of transformer T-2. The other terminal 101 of winding 96 is connected through conductor 101a to terminal 71 of the secondary winding 44 on toroid 40 of the differential transformer T-1.

Transformer T-2 and the circuit in which it is connected are quiescent when conditions in the power line circuit are normal and no ground is present on conductor N1 on the load side of transformer T-2. However, if the neutral wire N-1 is grounded on the load side of toroids 40 and 41 through an impedance of 4 ohms or less, a feedback circuit then exists through the one turn loop created by neutral wire N-1 passing through both toroids 40 and 41, which thereby magnetically couples the transformers T-1 and T-2. This feedback loop causes the operational amplifier stage of the I.C. to oscillate. Such oscillation is detected by the internal level detector stage of the I.C. in the same manner as a signal voltage resulting from occurrence of a ground fault. An output voltage thereupon appears on pin 5 of the level detector stage of the I.C., which gates the SCR 80 into conduction thereby causing trip coil 51 to open contacts 46 and 47, thus interrupting the circuit.

The circuit and components described above, will therefore interrupt the power line circuit both on occurrence of a ground fault on the load side of the toroids 40 and 41 and on occurrence of a grounded neutral on the load side of toroids 40 and 41.

The circuit interruption and reset mechanism includes a two-pole breaker assembly having a movable contact carrier 102 mounted for movement between a contact open and contact closed position. Stationary contacts 103a and 104a are mounted respectively on conductive end portions of line-side terminals 35a and 36a, contact 103a on electrified or "hot" terminal 35a and contact 104a on neutral terminal 36a.

Movable contacts 103b and 104b are mounted on lateral planar projections 105 and 106 of movable contact carrier 102 in alignment respectively with stationary contacts 103a and 104a for contact therewith when movable contact carrier 102 is moved to the contact closed position.

An integral projecting member 107 of contact carrier 102 extends outwardly from the planar surface thereof and between contacts 103b and 104b mounted on each side of the carrier. The projecting member 107 has a cross sectional configuration and dimension corresponding to that of a guide recess 108 in guide member 109 mounted on the inward facing side of printed circuit board 34, for sliding movement of projecting member 107 into and out of said guide recess 108, as the carrier 102 moves into contact closing position and away from the stationary contacts into contact open position.

Projecting member 107 includes a cylindrical recess 110 opening to side 111 of movable contact carrier 102 which faces in the direction of movement toward the contact open position. At the opposite end of cylindrical recess 110 is an axially aligned aperture 112 which opens into guide recess 108 of guide member 109 when contact carrier 102 is operably positioned for movement between contact closing and contact opening positions with projecting member 107 aligned with guide recess 108.

Guide recess 108 also includes an axially aligned aperture 113 through its roof portion 114.

An elongated pin 115 having a head 116 at one end with circumferentially projecting edge 117 extending radially outward from shank 118, is mounted with shank 118 extending through the axially aligned apertures 112 (of cylindrical recess 110 in the contact carrier projection 107) and 113 (of guide recess 108) with an end portion of shank 118 projecting beyond the roof 114 of guide member 109 to fixedly receive reset button 119 thereon.

Reset button 119 includes an axially aligned seating recess 120 opening to receive the end of shank 118 of pin 115 for securing it to the body of reset button 119 by means of a lock plate 121 seated in an annular groove at the end of shank 118. A cap 119a welded on reset button 119 traps the lock plate 121 in place to secure the end of shank 118 to reset button 119.

A helical latching spring 122 is loosely mounted on and co-axial with the upper portion of shank 118, between the outward facing side of domed roof portion 114 of guide member 109 and the inner end of seating recess 120 of reset button 119. The latching spring 122 bears against said roof portion 114 at one end and against said inner end of seating recess 120 at the other end, to bias said reset button in an unlatching direction away from said roof portion 114. When reset button 119 is fully biased away from domed roof portion 114 of guide member 109, the circumferentially projecting edge 117 of head 116 of elongated pin 115 is in abutting engagement against the inner end 123 of cylindrical recess 110 of the projecting member 107 of movable contact carrier 102. The projecting end 124 of projecting member 107 is at this time near the outer end 125 of guide recess 108.

A helical disconnect spring 126 is loosely mounted on and co-axial with the lower portion of shank 118 of elongated pin 115, between the projecting end 124 of projecting member 107 of contact carrier 102 and the inner end of guide recess 108 of the guide member 109. The disconnect spring 126 bears against said projecting end 124 of member 107 at one end and against said inner end of guide recess 108 at the other end, to bias said movable contact carrier and contacts 103b and 104b in a disconnect direction away from said stationary contacts 103a and 104a.

A latch 127 is mounted on the forward wall 128 of projecting member 107 of contact carrier 102, with latch finger 129 projecting resiliently into the cavity of cylindrical recess 110 near the open end 130 thereof. When reset button 119 is pushed inwardly fully against the bias of helical latch spring 122, the rounded surface 131 of head 116 of pin 115 pushes the resiliently projecting latch finger 129 outwardly to permit the head 116 of pin 115 to pass whereupon the latch finger 129 snaps back to project inwardly of cylindrical recess 110. The circumferentially projecting edge 117 of the pin head 116 thereupon latches against latch finger 129, and latch spring 122 then biases reset button 119 when released in a direction outwardly from the domed roof portion 114 of guide member 109. This carries elongated pin 115 and movable contact carrier 102 latched to the pin 115 to a contact closed position, whereby movable contacts 103b and 104b are brought into contact respectively with stationary contacts 103a and 104a.

The projecting member 107 of contact carrier 102 is at such time drawn into guide recess 108, which compresses disconnect spring 126 to provide spring loading for rapid separation of movable contacts 103b and 104b away from stationary contacts 103a and 104a when the tripping mechanism causes latch finger 129 to release head 116 of elongated pin 115.

The latch 127 includes a latch release plate portion 132 aligned with plunger type armature 133 which moves axially into unlatching engagement with latch release plate 132 when trip coil 51 is energized. When latch release plate 132 is thus engaged by armature 133, it is moved by the armature and carries latch finger 129 out of latching engagement with head 116 of pin 115, thus releasing projecting member 107 of contact carrier 102 and permitting it to move against the bias of disconnect spring 126 to the contact open position, thus interrupting the power line circuit.

At such time, reset button 119 is moved outwardly under the bias of latching spring 122 whereupon red band 134 around an intermediate portion of reset button 119 appears outwardly of outer surface 135 of receptacle cover 3 to indicate a tripped condition with the contacts separated.

To reset and close the contacts, reset button 119 is depressed until the head 116 of elongated pin 115 catches on latch finger 129. When button 119 is released, latching spring 122 biases reset button 119 outwardly carrying pin 115 and contact carrier 102 with it until the movable contacts 103b and 104b are in contact with their respective stationary contacts 103a and 104a. The receptacle circuit is now set and ready for use when a load is connected to load side terminals 35b and 36b.

Jaw members 136 and 137 project from load-side terminals 35b and 36b respectively, and grounding jaw member 138 projects from a grounding connection with mounting strap 4, to receive the corresponding prongs of an electrical plug connected to a load.

Jaw members 136 and 137 seat in respective compartment cells 15 and 16 of the receptacle case 2, and grounding jaw member 138 is seated in recess 12 of mounting pedestal 11 of receptacle case 2.

Load side terminals 35b and 35b include terminal screws 139 and 140 respectively, threadedly mounted through corresponding threaded apertures in the depending side walls of terminals 35b and 36b respectively. The shanks 139a and 140a of said terminal screws project inwardly from their respective terminal side walls. When the terminals 35b and 36b with their respective jaw members 136 and 137 are seated within the receptacle case 2, the projecting shanks 139a and 140a of the terminal screws are received through vertical slots 17 and 18 of side walls 19 and 20 of load-side compartment 8 of receptacle case 2.

Printed circuit board 34 lies on top of case 2 when the line side and load side terminals are seated in their respective compartments 7 and 8 as described. The electronic components mounted on inward facing side 39 of circuit board 34 lie within the intermediate compartment 6. Reset button 119 projects upwardly from the outward facing side 141 of circuit board 34, and test contact element 142 is also mounted on the outward facing side 141. End 142a of element 142 is connected to conductor 49 leading to trip coil 51 and end 142b thereof is resiliently spaced from contact with conductor 93 leading to the load side of line L1 through resistor 91.

Test button 143 includes recess 144 therein to receive contact element 142 therein. Contact element 142 is resilient, so test button 143 may be depressed when contact element 142 is seated therein to make contact with conductor 93 for testing. When test button 143 is released, the resilience of contact element 142 carries end 142b out of contact with conductor 93 and moves test button 143 outwardly.

Receptacle cover 3 is placed over printed circuit board 34 to hold it securely in place on receptacle case 2 with the electronic components depending from the inward facing side 39 thereof. Aperture 145 in cover 3 receives reset button 119 therethrough and aperture 146 receives test button 143 therethrough for external operation. When cover 3 is in place over the top of receptacle case 2, the internally threaded bore 31 of post 29 is in registration with aperture 32 in cover 3. Screw 33 secures cover 3 to case 2 when fully threaded into bore 31 of post 29. Cover 3 also include prong receiving apertures 147, 148 and 149 in registration with jaw members 136, 137 and 138, to receive the prongs of an electrical plug for connection of the receptacle to a load.

The ground fault receptacle assembly in accordance with this invention is compact enough to be mounted in outlet boxes of ordinary household or trade size, including all of those boxes for devices listed in Table 370-6(a) of the National Electrical Code which is reproduced below:

The words "trade size" when used in this specification and claims in relation to outlet boxes refer to the box dimensions in the foregoing table.

The outer dimensions of the ground fault receptacle assembly of this invention, including the receptacle case 2 and cover 3 are as follows:

Depth (a): From planar outer surface 150 of cover 3 to bottom planar surface 151 of case 2, *one and one-sixteenth inches*.

Depth (b): From the inner faces 152 of mounting ears 153 to the bottom planar surface 154 of mounting strap 152 and of bottom planar surface 151 of case 2, both of which surfaces are coplanar, *one inch*.

Width: Across the widest portion, *one and five-eighths inches*.

Length: From co-planar end surfaces 155 and 156 of case 2 and cover 3 at one end to the opposite coplanar end surfaces 157 and 158, *two and three-fourths inches*.

The ground fault receptacle assembly of this invention is accordingly compact enough and small enough to be inter-changeable with conventional household receptacles not having internally contained ground fault interrupting means, and it can be installed in the same outlet box as such conventional household receptacle which it may be used to replace.

The terminal compartments 7 and 8 in accordance with this invention, have a narrower width than the intermediate compartment 6, whereby there is room for screw type terminals and external access thereto, including terminal screws 37 and 38 on the line side and terminal screws 139 and 140 on the load side. Such compact structure of the receptacle and ground fault interrupting mechanism encased therein, eliminates the need for pig tail type terminals extending from the receptacle. The invention as described herein provides a ground fault receptacle having screw type terminals TABLE 370-6(a).

| Box Dimension, Inches Trade Size of Type | Boxes Min. Cu. In. Cop. | Maximum Number of Conductors | | | | |
|---|---|---|---|---|---|---|
| | | #14 | #12 | #10 | #8 | #6 |
| 4 × 1¼ Round or Octagonal | 12.5 | 5 | 5 | 5 | 2 | 1 |
| 4 × 1½ Round or Octagonal | 15.5 | 7 | 6 | 6 | 5 | 0 |
| 4 × 2⅛ Round or Octagonal | 21.5 | 10 | 9 | 8 | 7 | 0 |
| 4 × 1¼ Square | 18.0 | 9 | 8 | 7 | 6 | 0 |
| 4 × 1½ Square | 21.0 | 10 | 9 | 8 | 7 | 0 |
| 4 × 2⅛ Square | 30.3 | 15 | 13 | 12 | 10 | 0* |
| 4 11/16 × 1¼ Square | 25.5 | 12 | 11 | 10 | 1 | 0 |
| 4 11/16 × 1½ Square | 29.5 | 14 | 13 | 11 | 9 | 0 |
| 4 11/16 × 2⅛ Square | 42.0 | 21 | 18 | 16 | 11 | 6 |
| 3 × 2 × 1½ Device | 7.5 | 3 | 3 | 3 | 2 | 0 |
| 3 × 2 × 2 Device | 10.0 | 5 | 4 | 4 | 3 | 0 |
| 3 × 2 × 2¼ Device | 10.5 | 5 | 4 | 4 | 3 | 0 |
| 3 × 2 × 2½ Device | 12.5 | 6 | 5 | 5 | 4 | 0 |
| 3 × 2 × 2¾ Device | 14.0 | 7 | 6 | 5 | 4 | 0 |
| 3 × 2 × 3½ Device | 18.0 | 9 | 8 | 7 | 6 | 0 |
| 4 × 2⅛ × 1½ Device | 10.3 | 5 | 4 | 4 | 3 | 0 |
| 4 × 2⅛ × 1⅞ Device | 13.0 | 6 | 5 | 5 | 4 | 0 |
| 4 × 2⅛ × 2⅛ Device | 14.5 | 7 | 6 | 5 | 4 | 0 |
| 3¾ × 2 × 2½ Masonry Box/gang | 14.0 | 7 | 6 | 5 | 4 | 0 |
| 3¾ × 2 × 3½ Masonry Box/gang | 21.0 | 10 | 9 | 8 | 1 | 0 |
| FS—Minimum Internal Depth 1¾ Single Cover Gang | 13.5 | 6 | 6 | 5 | 4 | 0 |
| FD—Minimum Internal Depth 2⅜ Single Cover Gang | 18.0 | 9 | 8 | 7 | 6 | 1 |
| FS—Minimum Internal Depth 1¾ Multiple Cover Gang | 18.0 | 9 | 8 | 7 | 6 | 0 |
| FD—Minimum Internal Depth 2⅜ Multiple Cover Gang | 24.0 | 12 | 10 | 9 | 8 | 0 |

*Not to be used as a pull box. For termination only.

enabling connection of power line conductors directly to the body of the receptacle.

The cover 3 includes two raised regions 159 and 160, each having a peripheral configuration and dimension corresponding to the receptacle receiving apertures in standard household type duplex face plates. Apertures 145 and 146 are formed in raised region 159, and prong receiving apertures 147, 148 and 149 are formed in raised region 160 of the receptacle cover 3.

The mounting strap 4 includes two mounting ears 152, each respectively projecting outwardly in opposite directions from opposite ends of the receptacle 1. Apertures 161 are provided in said mounting ears 152. The mounting ears 152 and apertures 161 are spaced apart and positioned to correspond with the spaced apart mounting apertures of trade size outlet boxes for devices such as receptacles. The receptacle assembly in accordance with this invention is thereby useable in all of the trade size outlet boxes listed in Table 370-6(a) above which have such mounting apertures for mounting devices therein.

We claim:

1. A circuit for providing immunity from noise and nuisance tripping for a ground fault protective device having two or more electrical contacts connected to an electrical distribution system having two or more conductors, said circuit comprising:
   a means for tripping the electrical contacts of the ground fault protective device, said means for tripping being part of said device, and connected to a first of the two conductors;
   a power supply connected directly to a second of the two conductors and also connected to said means for tripping, said means for tripping being a selected impedance for limiting current to said power supply when noise voltage in the electrical distribution system exceeds a predetermined second level so that energy dissipated by said power supply does not exceed said power supply's dissipative capacity, said power supply having means for clipping the noise voltage when the noise voltage exceeds the predetermined second level;
   a ground fault responsive means for producing a fault signal, said ground fault responsive means being electrically connected to said two conductors;
   a switching means connected to said ground fault responsive means and responsive to the fault signal, said switching means being a silicon controlled rectifier having its anode connected to the AC side of said power supply and also to said means for tripping, its gate connected to circuitry in said ground fault responsive means, and its cathode-gate connected to the DC side of said power supply, thereby causing said silicon controlled rectifier to operate in the half wave mode and commutate off once every cycle so that, when a fault is removed by opening the electrical contacts, at the next line voltage excursion through zero, the silicon controlled rectifier turns off, said switching means being responsive to a predetermined first level of noise voltage, said switching means causing said means for tripping to be energized by said power supply when said switching means receives the fault signal from said ground fault responsive means; and
   wherein said predetermined second level of noise voltage is less than said predetermined first level of noise voltage thereby preventing said switching means from responding to noise voltage in the distribution system and, also, preventing inadvertent energizing of said means for tripping.

* * * * *